US010298756B2

(12) United States Patent
Gouw et al.

(10) Patent No.: US 10,298,756 B2
(45) Date of Patent: May 21, 2019

(54) SYSTEM AND METHOD FOR PREDICTING CONTACT CENTER BEHAVIOR

(71) Applicant: Interactive Intelligence, Inc., Indianapolis, IN (US)

(72) Inventors: Andy Raphael Gouw, Austin, TX (US); Bayu Aji Wicaksono, Laurel, MD (US)

(*) Notice: Subject to any disclaimer, the term of this patent is extended or adjusted under 35 U.S.C. 154(b) by 188 days.

(21) Appl. No.: 14/224,409

(22) Filed: Mar. 25, 2014

(65) Prior Publication Data
US 2015/0281448 A1    Oct. 1, 2015

(51) Int. Cl.
*H04M 3/51*     (2006.01)
*G06Q 10/06*    (2012.01)

(52) U.S. Cl.
CPC ........ *H04M 3/5175* (2013.01); *G06Q 10/067* (2013.01); *G06Q 10/0633* (2013.01); *G06Q 10/06393* (2013.01); *H04M 2203/551* (2013.01); *H04M 2203/556* (2013.01)

(58) Field of Classification Search
CPC .. H04M 3/51; H04M 2203/402; H04M 3/523; H04M 3/5232; H04M 3/5233; H04M 2203/401; H04M 3/5183; H04M 2203/408; H04M 2203/551
USPC .................................... 379/265.03
See application file for complete search history.

(56) References Cited

U.S. PATENT DOCUMENTS

| | | | |
|---|---|---|---|
| 5,390,243 A | 2/1995 | Casselman et al. | |
| 7,103,562 B2* | 9/2006 | Kosiba | G06Q 10/04 379/265.06 |
| 7,415,385 B2* | 8/2008 | Azarbayejani | G08B 31/00 702/179 |
| 7,761,742 B2* | 7/2010 | Di Palma | G06F 11/3452 714/15 |
| 7,941,745 B2* | 5/2011 | Marukawa | G06F 17/218 707/781 |
| 8,285,283 B2 | 10/2012 | Hande et al. | |
| 8,462,933 B2 | 6/2013 | Omiya | |
| 8,582,752 B1 | 11/2013 | Anisimov et al. | |
| 8,612,272 B1 | 12/2013 | Aykin | |
| 2002/0184069 A1 | 12/2002 | Kosiba et al. | |

(Continued)

FOREIGN PATENT DOCUMENTS

| | | |
|---|---|---|
| JP | 201041104 A | 2/2010 |
| WO | WO2015147798 A1 | 10/2015 |

OTHER PUBLICATIONS

Jouini, Oalid et al., Performance Indicators for Call Centers with Impatience, Jul. 7, 2012.*

(Continued)

*Primary Examiner* — Ahmad F. Matar
*Assistant Examiner* — Jirapon Intavong (57) ABSTRACT

A system and method are presented for predicting contact center behavior. In one embodiment, closed form simulation modeling may be used to simulate behavior from input distributions. Models may be created through staging and analysis of historical Automatic Call Distribution data. Service level, average speed of answer, abandon rate, and other data may be predicted to generate forecasts and analysis of contact center behavior. Examples of behavior may include staffing levels, workload, and the Key Performance Index of metrics such as service level percentage, average speed of answer, and abandonment rate percentage.

54 Claims, 5 Drawing Sheets

(56) References Cited

U.S. PATENT DOCUMENTS

| | | | |
|---|---|---|---|
| 2005/0129212 A1* | 6/2005 | Parker | H04M 3/5238 |
| | | | 379/265.03 |
| 2007/0206769 A1 | 9/2007 | O'Dell | |
| 2011/0289078 A1* | 11/2011 | Woodard | G06F 17/30884 |
| | | | 707/723 |
| 2012/0014519 A1* | 1/2012 | Kosiba | G06Q 10/04 |
| | | | 379/265.08 |

OTHER PUBLICATIONS

Mandelbaum et al., The M/M/n+G Queue: Summary of Performance Measures, Jan. 16, 2009.*

International Search Report dated Aug. 21, 2014 in related foreign filed application PCT/US14/31685, filed Mar. 25, 2014.

Jouini, Oualid, et. al., "Performance Indicators for Call Centers with Impatience". Published Jul. 7, 2012, University of Amsterdam. Accessed at http://www.math.vu.nl/~koole/publications/papers/2013_IIE_Tr_JouiniKooleRoubos.pdf Mar. 24, 2014.

Mandelbaum, Avishai, et al., "The Palm/Erland—A Queue, with Applications to Call Centers". Jun. 19, 2005, Israel Institute of Technology. Accessed at http://iew3.technion.ac.il/serveng/References/Erlang_A.pdf on Mar. 24, 2014.

Chilean First Office Action with English Translation for Application No. 201602401, dated Jan. 17, 2018, 12 pages.

International Preliminary Report for Application No. PCT/US14/31685, dated Jul. 27, 2015, 13 pages.

Supplementary European Search Report for Application No. EP 14 88 7258, dated Aug. 23, 2017, 6 pages.

Japanese Office Action with English Translation for Application No. 2016-558661, dated Apr. 4, 2018, 15 pages.

Japanese English Translation of Office Action for Application No. 2016-558661, dated Sep. 28, 2018, 4 pages.

* cited by examiner

SYSTEM AND METHOD FOR PREDICTING CONTACT CENTER BEHAVIOR

BACKGROUND

The present invention generally relates to telecommunications systems and methods, as well as contact center behavior. More particularly, an embodiment pertains to predicting the behavior of a contact center.

SUMMARY

A system and method are presented for predicting contact center behavior. In one embodiment, closed form simulation modeling may be used to simulate behavior from input distributions. Models may be created through staging and analysis of historical Automatic Call Distribution data. Service level, average speed of answer, abandon rate, and other data may be predicted to generate forecasts and analysis of contact center behavior. Examples of behavior may include staffing levels, workload, and the Key Performance Index of metrics such as service level percentage, average speed of answer, and abandonment rate percentage.

In one embodiment, a method for calculating the predicted service performance of a contact center is described, comprising the steps of: performing analysis and staging of the historical Automatic Call Distribution data for the contact center; building a model from the analysis and staging of historical Automatic Call Distribution data; validating the model; and using the validated model to predict the behavior of the contact center.

In another embodiment, a method for predicting contact center queuing and customer patience behavior in order to calculate service performance in a contact center is described, comprising the steps of: performing analysis and staging of the historical Automatic Call Distribution data for the contact center, wherein the historical Automatic Call Distribution data comprises one or more of: contact volume, average handle time, full time equivalency (FTE), capture rate, contact handling data for contact types, and contact handling data for staffing types, for a specified interval; building a simulation model from the analysis and staging of the historical Automatic Call Distribution data, wherein from the staged Automatic Call Distribution data, a Key Performance Index is extracted at an interval level equivalent to the extracted historical Automatic Call Distribution data; validating the simulation model using the extracted historical Automatic Call distribution data; and using the validated simulation model to predict the contact center queuing and customer patience behavior.

DETAILED DESCRIPTION

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Models are traditionally used by analysts in the contact center industry to predict, plan and analyze contact center behavior. Examples may include time series forecasting-based models, regression-based models, queuing theory-based equations, and custom discrete event simulation modeling. These models are often computationally slow, difficult to use and limited in capability and applicability.

While time series forecasting concentrates on identifying patterns and seasonality in the data, the regression model seeks a relationship between independent and dependent variables in order to build a regression. Both assume that what has occurred in the past will continue in the future as repeatable trends. Thus, the models are typically used for short term prediction rather than long term prediction and do not react well to variations that cause systemic changes. These models are not ideal for a contact center with behaviors that change over time.

"Erlang" equations are widely known and used in queuing theory in contact center queues. These equations may be used to estimate workforce demand given average handle time and volume offered. However, due to the simplifying assumptions, accuracy generally lacks in Erlang equations. Erlang equations assume that no communications are abandoned, which may mean, for example, that every customer stays on the line ad infinitum until their communication is handled. Erlang equations also assume that every communication is similar, which ignores the fact that contact center routings and/or strategies can change drastically over time.

While advancements in these equations have been made as queuing theory has evolved, the advancements assume that the customer impatience profile, or the length of time a customer is willing to wait before abandoning the communication, falls into a well-established distribution pattern (i.e., exponential or hyper-exponential distribution). This is not always true in the real world. For example, during a new product release event, customers may be more patient than in communications regarding regular support or service communications. As such, a lack of accuracy of contact center capacity, scheduling and performance predictions may result.

Discrete event simulation modeling is generally thought to be the most accurate and precise in its ability to predict contact center behavior due to its flexibility. It can be created/customized to any specific routings. A key factor that contributes to its accuracy is the ability to incorporate an accurate model of a customer patience profile which compares the abandon rate to the handling time. However, discrete event simulation modeling is very complex and also has a slow computational time. In order to decrease the computational time, simulations may be pre-run and the results stored in a database to be used in the workforce management/analytic application. Every time the underlying system behavior changes, the simulation models need to be rebuilt and pre-run again and again. Thus, there is a need for a way to easily, quickly and accurately predict contact center behavior.

Figure 1:
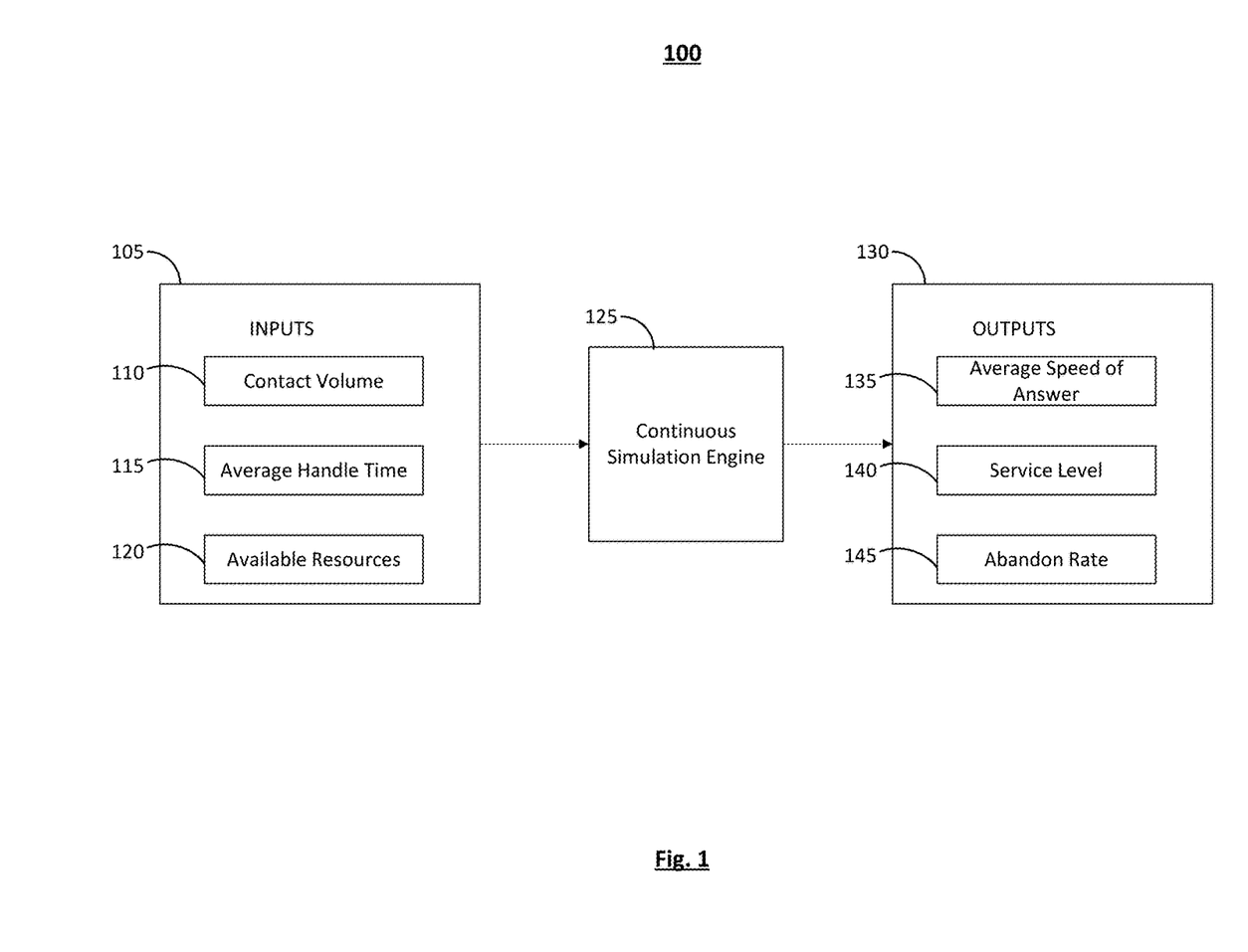
FIG. 1 is a diagram illustrating the basic components of an embodiment of a system.

FIG. 1 is a diagram illustrating the basic components of an embodiment of a system. The basic components of the system 100 may include: Inputs 105 which may include Contact Volume 110, Average Handle Time 115, and Available Resources 120; Continuous Simulation Engine 125; and Outputs 130 which may include Average Speed of Answer 135, Service Level 140, and Abandon Rate 145.

The Inputs 105 may comprise information that is fed into the Continuous Simulation Engine 125. Inputs may be at an interval level, such that an interval in which the model is built on is specified. Intervals may comprise 30 minutes, 1 hour, daily, weekly, etc. Inputs 105 may be given for a contact type, such as a telephone call, for example, and may comprise Contact Volume 110, Average Handle Time 115, and Available Resources 120. The Contact Volume 110 may comprise the amount of interactions in the queue. A contact may comprise any kind of inbound communication, interaction, contact, or function requiring processing or response by the receiving entity. An entity may comprise an inbound contact center or a group of inbound contact centers that share incoming contact volume, where varying volumes of inbound contacts, such as telephone calls, e-mails, web 'chat', or traditional paper mail are processed with the goal of achieving desired service quality metrics. The Average Handle Time 115 may comprise the average amount of time a contact is handled by an agent across a pool of Available Resources 120. The Available Resources 120 may comprise the pool of some number of agents and/or servers that are available and able to service the contact from the queue.

The Continuous Simulation Engine 125 comprises closed form simulation modeling. The Continuous Simulation Engine 125 may be an engine or a modular library (such as an API) that can be easily integrated with any existing workforce management and long term planning system to allow interaction-specific prediction of Outputs 130. The Continuous Simulation Engine 125 may function without the need to pre-run a simulation and store, or cache, the simulation results as discrete event simulation does. In one embodiment, the Continuous Simulation Engine 125 does not require the assumption of no abandonments in forming the predictions, which is unlike Erlang-B or Erlang-C equations. By assuming that no customers who contact the contact center hang up if forced to wait an excessive amount of time for an agent, gross inaccuracies in forecast performance may result. The Continuous Simulation Engine 125 may work in two phases, as further described below in FIGS. 2 and 3.

The Outputs 130 may be used for generating forecasts and analysis of contact processing center behavior for planning purposes over short, medium, and long-term planning horizons. Outputs may also be at an interval level, such that an interval in which the model is built on is specified. Intervals may comprise 30 minutes, 1 hour, daily, weekly, etc. The Outputs 130 from the Continuous Simulation Engine 125 may comprise an Average Speed of Answer 135, a Service Level 140, and an Abandon Rate 145. While the examples of Average Speed of Answer 135, Service Level 140, and Abandon Rate 145 are illustrated, it is within the scope of this disclosure to include other performance metrics of contact center behavior such as staffing levels, workloads, etc., to name a few. Other examples of performance metrics may include staff occupancy/utilization, capture rate (how many of a contact is being handled by a staff type as compared to an other staff type), purity rate (how much of a staff type's time is allocating on handling a contact compared to an other contact), expected wait time until abandon, probability of waiting in a queue for some amount of time, and the queue length at any given time. Inputs 105 do not necessarily need to be at the same interval level as the desired output. For example, an input may be at a daily level, but the desired output is at the weekly level.

Figure 2:
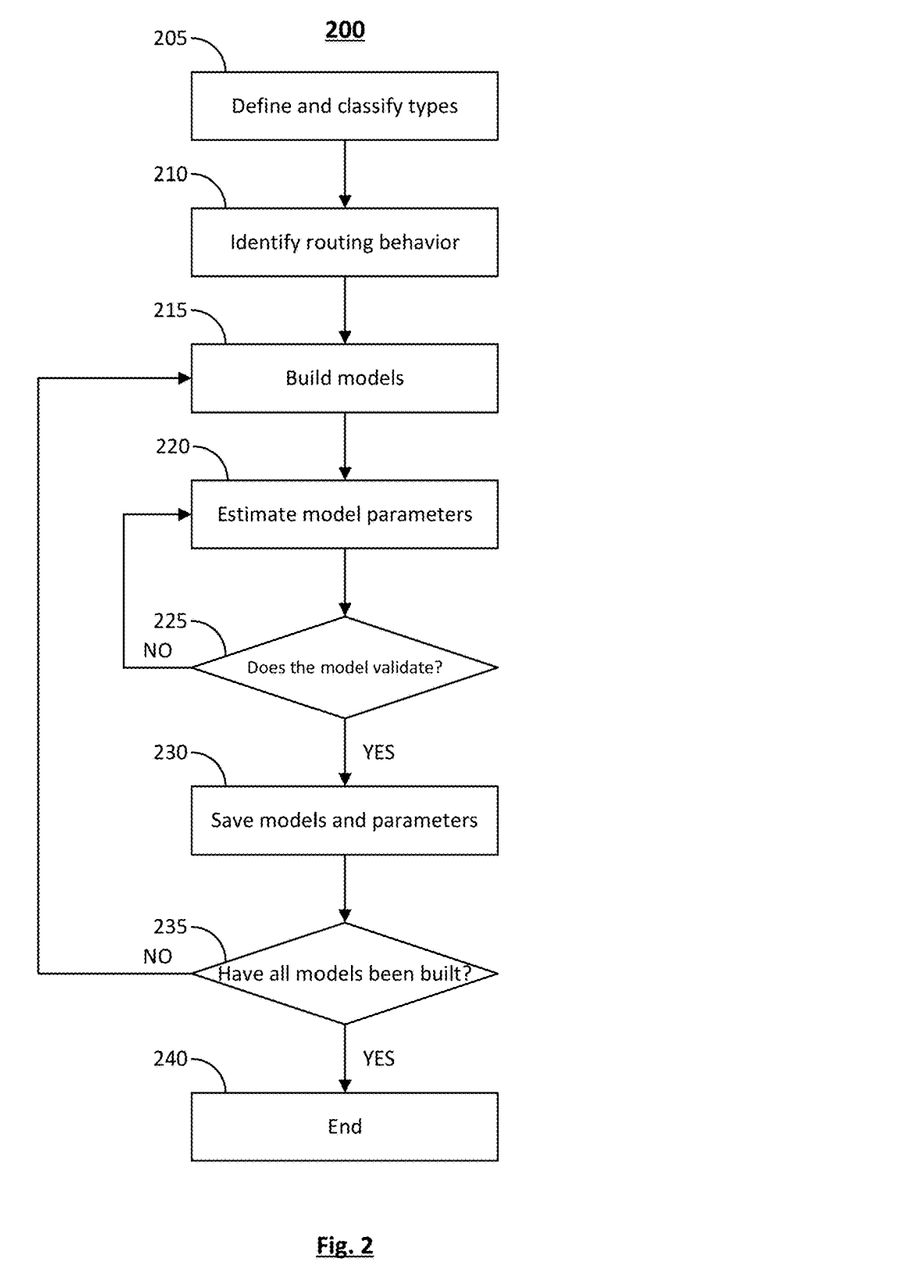
FIG. 2 is a flowchart illustrating an embodiment of a process for model creation.

FIG. 2 is a flowchart illustrating an embodiment of a process 200 for model creation. The process 200 may be operative in the Continuous Simulation Engine 125 in the system 100 (FIG. 1).

In operation 205, types are defined and classified. For example, historical Automatic Call Distribution (ACD) data may be used to define and classify the contact, or interaction, types in order to determine, whether automatically or by user instructions, which ones are to be used for planning purposes. Staff types may also be defined for planning purposes. Staff types may be defined automatically or by user instructions. A staffing type may comprise a skill set possessed by one or more agents who utilize the skill set to handle certain types of communications or interactions. Agents may belong to more than one groups determined by skill set, such as an agent who is bilingual, for example. Agents may also be classified based on their role within the workgroup, such as supervisor, representative, etc. Control is passed to operation 210 and process 200 continues.

In operation 210, routing behavior is identified. For example, information may be obtained from the historical ACD data to determine how contact and/or interactions may be routed (i.e., which agents handle which interactions). Information about contact types, staff types, interaction priorities, agent utilizations, available staffing ratios and the expected range of interactions that each staff types will have may also be obtained from the historical ACD data. Control is passed to operation 215 and process 200 continues.

In operation 215, models are built. For example, the process will iterate over the identified contact and/or interaction types and build models for each type. In order to build a model, the customer patience profile of the contact is evaluated. This may be done, for example, by plotting how many interactions are abandoned after customers have been waiting for some amount of time, represented by 'x' below. Once a successful customer patience profiled has been identified, iteration over a set of model parameters is performed and then validated against historical ACD data for that type. Control is passed to operation 220 and process 200 continues.

In operation 220, model parameters are estimated. For example, the model parameters may be defined to contain the interval, a Customer Service Representative Factor (CSRF), a Service Level Threshold, a Delay, and the Patience curve profile. The interval width may indicate an amount of time, such as the number of minutes per planning interval. This may be 15 minutes, 30, or 60. The CSRF represents the efficiency factor of the agent groups, such as 0.9, or 90% efficiency. The Service Level Threshold may be a limit set, such as 20 seconds, for which a communication should be handled to meet the service level goal. Delay may comprise an artificial delay that is introduced to every communication before it can be serviced by an agent. This may be any integer number greater or equal to zero and may be in seconds, such as 5 seconds, for example. The patience curve profile may be derived from the historical ACD data using the piecewise regression method. Control is passed to operation 225 and process 200 continues.

In operation 225, it is determined whether or not the model validates. If it is determined that the model validates, control is passed to operation 230 and process 200 continues. If it is determined that the model does not validate, control is passed back to operation 220 and process 200 continues.

The determination in operation 225 may be made based on any suitable criteria. For example, the Continuous Simulation Engine 125 may perform the validation through a mathematical process. If a good fit is not found, the process starts again from operation 220 until a suitable model that validates against historical ACD data is found.

In operation 230, models and parameters are saved. For example, all the model parameters along with the customer patience profile may be saved in a central repository or a text based file. Control is passed to operation 235 and process 200 continues.

In operation 235, it is determined whether or not all models have been built. If it is determined that all models have been built, control is passed to operation 240 and the process continues. If it is determined that not all models have been built, control is passed back to operation 215 and process 200 continues.

The determination in operation 235 may be made based on any suitable criteria. For example, each model is associated with a specific contact type. A model may be complete when all of its parameters (such as service level threshold, CSRF, delay, and patience curve profile, for example) have been estimated and, applying these parameters to the continuous simulation process, validated against historical ACD data. This may be repeated for as many contact types that are defined in the routing profile in operation 210.

In operation 240, the process has ended.

Figure 3:
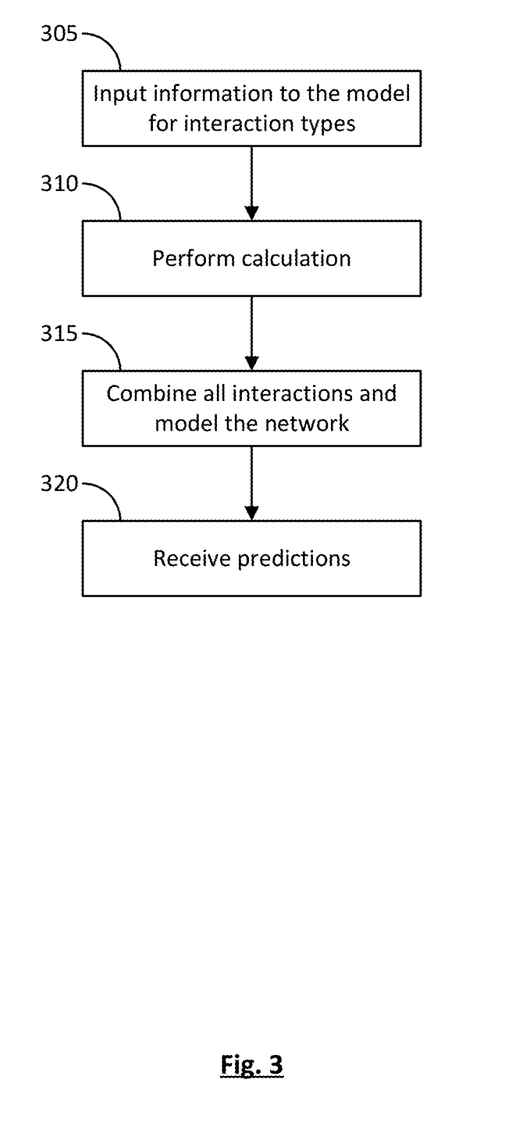
FIG. 3 is a flowchart illustrating an embodiment of a process for prediction.

FIG. 3 is a flowchart illustrating an embodiment of a process for prediction. The process 300 may be operative in the Continuous Simulation Engine 125 in the system 100 (FIG. 1).

In operation 305, information is input to the model for the different types. For example, contact center inputs in their original form (e.g., weekly or monthly staff, average handle times and volume) are distributed to the same intervals in which the simulation model was built for in process 200. Information is also considered pertaining to how contacts, or interactions, are routed or planned to be routed as well as what goals to achieve, agent prioritization and expected agent utilization. Control is passed to operation 310 and process 300 continues.

In operation 310, the behaviors are simulated for each contact/interaction type. For example, for each interaction type, contact center behavior is simulated and the marginal increase in Key Performance Indicators (KPI) when the input changes are evaluated. In an embodiment, the simulation may be performed mathematically. For example, the service level may be calculated mathematically as follows:

$$SL = \frac{\text{Number of calls answer in less than or equal to } \tau \text{ seconds}}{\text{Total calls offered}} * 100$$

Where $\tau$ represents the Acceptable Wait Time, which may be defined with the Service Level Goal. For example, the Service Level Goal may be 80/20, for which 80% of communications handled within a threshold of 20 seconds. In this example, 20 seconds=$\tau$). SL represents the Service Level and is expressed as a percentage.

The above equation may then be written as:

$$SL = \frac{\varepsilon + e^u - 1 + s\mu(J - J(\tau))}{\varepsilon + \lambda J} * 100$$

Where $\mu$ represents the mean processing rate of contacts, such as calls, for example, per unit of time or the call arrival rate, s represents the number of agents or servers, J represents the function of time variable and is described in more detail below, and $\lambda$ represents the call arrival rate. $\varepsilon$, which represents the inverse of the probability of blocking, may be calculated as:

$$\varepsilon = \frac{\sum_{i=0}^{s-1} \frac{\left(\frac{\lambda}{\mu}\right)^i}{i!}}{\frac{\left(\frac{\lambda}{\mu}\right)^{s-1}}{(s-1)!}} = \frac{1}{\text{Probability of Blocking}}$$

The probability of blocking may refer to the probability of a new contact arriving and being rejected by a group of identical parallel resources that are all currently busy, such as telephone lines, circuits, traffic channels, etc., for example. u may be calculated as:

$$u = \lambda H(\tau) - s\mu\tau$$

where $H(\tau)=H(x)|_\tau$=hazard function for random variable X given $\tau$. Random variable X represents the average wait time (i.e., patience time, in seconds) before a caller abandons the queue. Solving for u is performed by:

$$H(x) = \int_0^x \text{ survival function of } x = \int_0^x (1 - F(x))dx$$

Figure 4:
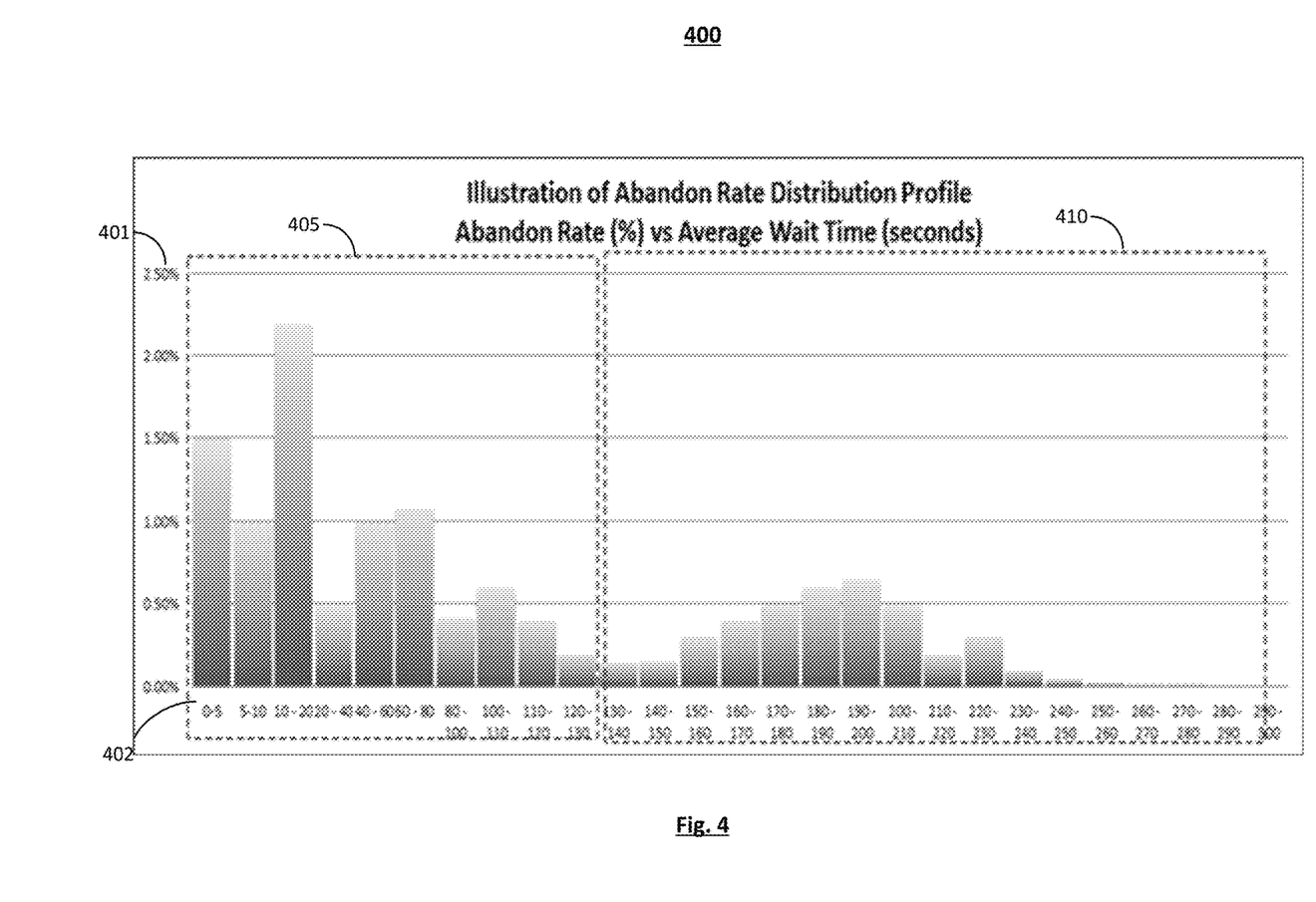
FIG. 4 is a diagram illustrating a sample abandon rate distribution profile.

F(x) represents the cumulative distribution function of random variable X. The F(x) function is derived from the abandon distribution profile mined from real data. In one embodiment, two probability density zones can be defined as illustrated in FIG. 4. FIG. 4 illustrates an embodiment of the abandon rate distribution profile with the Abandon Rate percentage, 401, compared with the Average Wait Time (expressed in seconds, in this example), 402. Zone 1, 405, is the step-function probability distribution, which comprises several uniformly distributed probability distribution functions. Zone 2, 410, is the triangular-distribution probability distribution, which comprises one triangular distribution with minimum, median, and maximum parameters. This triangular distribution governs the behavior of the customer who is waiting to wait in the queue for a certain amount of time before abandonment.

H(x) represents the hazard function of random variables x through the passage of wait-time in queue. This may further be defined as the sum of the hazard function of Zone 1, 405, and Zone 2, 410. The generic definition of the Hazard function, which is:

$H(x) = \int_0^x$ survival function of $x = \int_0^x (1-F(x))dx$ where F(x) is the cumulative distribution function of the random variables x, may be altered as follows for Zone 1, 405. For a bucket patience profile, in which a wait-time random variable x lies, bounded by the region of lower bound value of $k_{lb}$ and upper bound value of $k_{ub}$ (i.e., the ad-hoc bucket of $k_{lb} \leq x \leq k_{ub}$), its hazard function is derived as:

$$H(x) = \int_{i=0}^{k_{lb}} H(k_i) + H(x) \text{ of ad hoc bucket}$$

where $$H(x) \text{ of ad hoc bucket} = \left(T_{Zone 1} - F(k_{lb}) * (x - k_{lb}) + \right.$$

-continued $$\left(\frac{F(k_{ub}) - F(k_{lb})}{k_{ub} - k_{lb}}\right)(k_{lb})(x - k_{lb}) - 0.5\left(\frac{F(k_{ub}) - F(k_{lb})}{k_{ub} - k_{lb}}\right)(x^2 - k_{lb}^2)$$

$T_{Zone\ 1}$ represents the total probability of the Zone 1, 405, area and the value may be between 0 and 1. Since $k_{lb}$ of the ad-hoc bucket is not necessarily equal to zero, and there can be many buckets preceding the ad-hoc bucket, the hazard function each of the i buckets is:

$H(x) = \int_{i=0}^{k_{lb}} H(k_i)$, for all buckets that preceded the $k_{lb} \leq x \leq k_{ub}$ bucket. Thus, $$H(k_i) = \left(T_{Zone\ 1} - F(k_{lb\ of\ i}) * (k_{ub\ of\ i} - k_{lb\ of\ i}) + \right.$$
$$\left(\frac{F(k_{ub\ of\ i}) - F(k_{lb\ of\ i})}{k_{ub\ of\ i} - k_{lb\ of\ i}}\right)(k_{lb\ of\ i})(k_{ub\ of\ i} - k_{lb\ of\ i}) -$$
$$\left. 0.5\left(\frac{F(k_{ub\ of\ i}) - F(k_{lb\ of\ i})}{k_{ub\ of\ i} - k_{lb\ of\ i}}\right)(k_{ub\ of\ i}^2 - k_{lb\ of\ i}^2)\right)$$

In order to determine the hazard function of a step-function-like distribution profile, using the previous equation, the hazard function calculation is performed of the first bucket when $k_{lb} = 0$ and the value is stored. Hazard functions are determined sequentially for each bucket using the lower and upper bound of bucket$_i$ in the definite integral, and the values summed for all buckets until the bucket with the lower bound value equal to the lower bound value of the ad-hoc bucket is met. The final value of the summation may be represented by 'sumofHazzardPreceding'. As such, the hazard function of the random variable x may be formulated and the final result will be a mathematical equation in terms of x.

Figure 5:
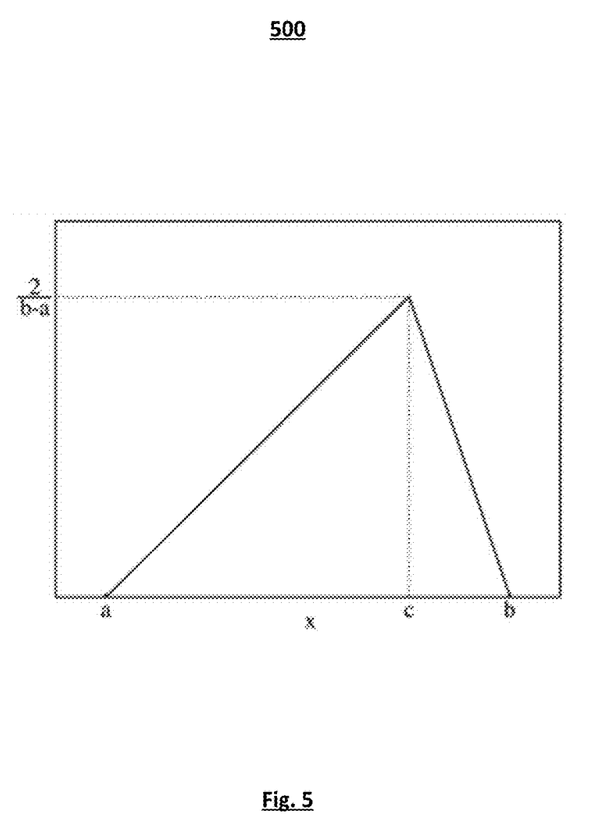
FIG. 5 is a diagram illustrating a sample triangular distribution model.

Since Zone 2, 410, is modeled as a triangular distribution, the hazard function of such distribution may be derived from the generic definition of hazard function where FIG. 5 represents an example of the solution determined from the following:

For $0 \leq x \leq a$, $H(x) = x * (1 - T_{Zone\ 1})$.

For $a \leq x \leq c$, $H(x) =$
$$H(x)\ of\ interval\ [0, a] + \left[(x - a) - \left(\frac{(x - a)^3}{3(b - a)(c - a)}\right)\right] * (1 - T_{Zone\ 1}).$$

For $c \leq x \leq b$, $H(x) = H(x)$ of interval $[0, a] +$
$$H(x)\ of\ interval\ [a, c] + \left(\frac{(b - c)^3 - (b - x)^3}{3(b - a)(c - a)}\right) * (1 - T_{Zone\ 1})$$

For $x \geq b$, $H(x) = H(x)$ of interval $[0, a] +$
$H(x)$ of interval $[a, c] + H(x)$ of interval $[c, b]$ $J(t) = J \rightarrow$ Function of the time variable $(t)$
across the entire $x$ random variable $= \int_t^\infty e^{\lambda H(x) - s\mu x} dx$, which may be solved using the computer numerical integration technique. Thus, $J(\tau) = J(t)|_\tau$ $J = J(0) = J(0)|_\tau$ The abandon rate may be calculated mathematically as follows as a percentage:

$$\text{Abandon rate} = \frac{(1 + (\lambda - s\mu)J)}{\varepsilon + \lambda J} * 100$$

Where: $J = J(0)$ from above and $\varepsilon$ is also calculated from above.

The Average Speed of Answer (ASA) may be calculated mathematically as follows:

$$ASA = \frac{\text{Total Waiting Time}}{\text{Calls Handled}} = \frac{(s\mu J_1) - J}{\varepsilon + s\mu J - 1}$$

Where: $J = J(0)$ and $\varepsilon$ is also calculated from above and:

$J_1(t) = J_1$ function of time variable t across the entire x random variables $= \int_t^\infty x \cdot e^{\lambda H(x) - s\mu x} dx$, which may be solved using the computer numerical integration technique. Thus, $J_1 = J_1(0) = J_1(t)|_0$ In operation 315 (FIG. 3), a new model is formed. For example, the new model may combine all of the contact/interaction types using linear programming or heuristic where the KPI metrics are calculated, as well as how interactions flow and how agent are utilized. Control is passed to operation 320 and process 300 continues.

In operation 320, predictions are received and the process ends. For example, the model outputs KPI metrics such as service level, average speed of answer, abandon rate, and occupancy, to name a few, may be viewed. Staff and volume allocations may also be viewed.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for calculating a predicted service performance of a contact center comprising the steps of:
   a. performing analysis and staging of historical Automatic Call Distribution data for the contact center;
   b. building a model from the analysis and staging of the historical Automatic Call Distribution data, the model comprising a patience curve profile, the patience curve profile being computed based on a customer patience profile comprising a plurality of buckets and a plurality of abandon rates, each of the abandon rates corresponding to one of the buckets, wherein each said abandon rate is determined using the mathematical equation Abandon rate (%)=$(1+(\lambda-s\mu)J)/(\varepsilon+\lambda J)*100$, wherein $\lambda$ represents a call arrival rate, s represents a number of agents or servers, $\mu$ represents a mean processing rate, J represents a function of time variable, and $\varepsilon$ represents an inverse of probability of blocking;
   c. validating the model against the historical Automatic Call Distribution data; and d. using the validated model to predict the behavior of the contact center, wherein the behavior of the contact center includes at least one of the following: routing, goals, agent prioritization and expected agent utilization.

2. The method of claim 1, wherein step (a) further comprises the steps of:
   a. defining and classifying a contact type from the historical Automatic Call Distribution data;
   b. determining which of the contact types are to be used for planning purposes;
   c. defining which types of staff to obtain the prediction for; and
   d. determining where to route a contact.

3. The method of claim 2, wherein the determining of step (b) is performed automatically.

4. The method of claim 2, wherein the determining of step (b) is performed manually.

5. The method of claim 2, wherein the defining of step (c) is performed automatically.

6. The method of claim 2, wherein the defining of step (c) is performed manually.

7. The method of claim 2, wherein the determining of step (d) is based on one or more of the following: agent utilization, available staffing ratios, expected range of interaction for the staff type, contact priority, and contact type handling.

8. The method of claim 1, wherein the model is built in a predetermined structure.

9. The method of claim 1, wherein step (c) further comprises the steps of:
   a. evaluating customer patience profiles, wherein said evaluating comprises plotting a number of interactions abandoned after an amount of time to obtain a set of model parameters;
   b. identifying an effective customer patience profile;
   c. analyzing the set of model parameters and validating the analysis against the historical Automatic Call Distribution data, after the effective customer patience profile has been identified, to determine if a desired model is found;
   d. re-starting the process from step (a) if the desired model is not found until the desired model, which validates against the historical Automatic Call Distribution data, is found; and
   e. saving the model parameters and the customer patience profiles.

10. The method of claim 9, wherein the customer patience profiles of step (a) are derived from the historical Automatic Call Distribution data comprising the steps of:
    a. reading one or more of: model parameters, patience curves, and inputs;
    b. evaluating segmentations; and
    c. analyzing a relationship between abandoned interactions and wait time to derive the customer patience profiles.

11. The method of claim 10, wherein the inputs comprise interval level data of one or more of: contact volume, average handle time, and effective staff.

12. The method of claim 9, wherein the analysis of step (c) further comprises the steps of:
    a. determining the abandon rate, wherein extrapolation is performed if the determination produces an undefined value;
    b. determining a number of abandons;
    c. determining a service level, wherein extrapolation is performed if the determination produces an undefined value; and
    d. determining an average speed of answer value comprising: performing a reverse lookup and analyzing the patience curve relationship to obtain the average speed of answer value from the abandon rate value.

13. The method of claim 11, wherein extrapolation further comprises executing a search to find points where the determination has a number value.

14. The method of claim 11, wherein the number of abandons is determined by multiplying the abandon rate by contact volume.

15. The method of claim 11, wherein the service level is determined using the mathematical equation $$SL(\%) = \frac{\varepsilon + e^u - 1 + s\mu(J - J(\tau))}{\varepsilon + \lambda J},$$

wherein $\varepsilon$ represents the inverse of probability of blocking, p represents the mean processing rate, s represents the number of agents or servers, J represents the function of time variable, and $\tau$ represents an Acceptable Wait Time.

16. The method of claim 11, wherein step (d) further comprises comparing the average speed of answer value to a triangular distribution lower limit.

17. The method of claim 16, wherein the average speed of answer value is less than the triangular distribution lower limit and the process ends.

18. The method of claim 16, wherein the average speed of answer value is greater than or equal to the triangular distribution lower limit, wherein the average speed of answer value is determined using the mathematical equation $$ASA = \frac{(s\mu J_1) - J}{\varepsilon + s\mu J - 1},$$

wherein s represents the number of agents or servers, $\mu$ represents the mean processing rate, J represents the function of time variable, and $\varepsilon$ represents the inverse of probability of blocking.

19. The method of claim 1, wherein step (d) further comprises the steps of:
    a. applying inputs as one or more of the following: daily staffing, weekly staffing, monthly staffing, average handle time, and volume;
    b. converting, by interval distributions, any higher granularity intervals into simulation model intervals;
    c. applying interval inputs to the validated model for all contact types;
    d. simulating contact center behavior for each contact type;
    e. evaluating any marginal increase in key performance index for the contact center when input changes;
    f. combining all contact types to model the entire contact center network to determine key performance index values relevant to a holistic system; and
    g. creating a holistic model that combines all contact types.

20. The method of claim 19, wherein the holistic model of step (g) is created with metrics comprising one or more of: average speed of answer, abandonment rate, service level, contacts cross flow volumes, capture rates, prioritizations, and agent utilization.

21. The method of claim 20, wherein the creation is performed using the model with the parameters and segmentation obtained during validation.

22. The method of claim 2, wherein the contact type comprises one or more of: inbound telephone call, e-mail, live chat, and outbound call.

23. The method of claim 2, wherein the type of staff comprises a grouping of one or more agents having a desired skill set.

24. The method of claim 19, wherein the interval distributions comprise a unit of time.

25. The method of claim 24 wherein said unit of time comprises one of: hourly, daily, weekly, and monthly.

26. A method for predicting contact center queuing and customer patience behavior in order to calculate service performance in a contact center, comprising the steps of:
  a. performing analysis and staging of historical Automatic Call Distribution data for the contact center, wherein the historical Automatic Call Distribution data comprises one or more of: contact volume, average handle time, full time equivalency, capture rate, contact handling data for contact types, and contact handling data for staffing types, for a specified interval;
  b. building a simulation model from the analysis and staging of the historical Automatic Call Distribution data, wherein from the staged Automatic Call Distribution data, a Key Performance Index is extracted at an interval level equivalent to the extracted historical Automatic Call Distribution data, the simulation model comprising a patience curve profile, the patience curve profile being computed based on a customer patience profile comprising a plurality of buckets and a plurality of abandonment rates, each of the abandonment rates corresponding to one of the buckets;
  c. validating the simulation model using the extracted historical Automatic Call distribution data, the validating comprising comparing an average speed of answer value to a triangular distribution lower limit, the average speed of answer value being determined using the mathematical equation $$ASA = \frac{(s\mu J_1) - J}{\varepsilon + s\mu J - 1},$$

wherein s represents a number of agents or servers, $\mu$ represents a mean processing rate, J represents a function of time variable, and $\varepsilon$ represents an inverse of probability of blocking; and
  d. using the validated simulation model to predict the contact center queuing and customer patience behavior, wherein the behavior of the contact center includes at least one of the following: routing, goals, agent prioritization and expected agent utilization.

27. The method of claim 26, wherein the interval comprises a unit of time.

28. The method of claim 27, wherein said unit of time comprises at least one of: hourly, daily, weekly, and monthly.

29. The method of claim 26, wherein said Key Performance Index comprises one or more of the following metrics: average speed of answer, abandon rate, capture rate, and service level.

30. The method of claim 26, wherein step (a) further comprises the steps of:
  a. defining and classifying a contact type from the historical Automatic Call Distribution data;
  b. determining which of the contact types are to be used for planning purposes;
  c. defining which types of staff to obtain the prediction for; and
  d. determining where to route a contact.

31. The method of claim 30, wherein the determining of step (b) is performed automatically.

32. The method of claim 30, wherein the determining of step (b) is performed manually.

33. The method of claim 30, wherein the defining of step (c) is performed automatically.

34. The method of claim 30, wherein the defining of step (c) is performed manually.

35. The method of claim 30, wherein the determining of step (d) is based on one or more of the following: agent utilization, available staffing ratios, expected range of interaction for the staff type, contact priority, and contact type handling.

36. The method of claim 26, wherein the model is built in a predetermined structure.

37. The method of claim 26, wherein step (c) further comprises the steps of:
  a. evaluating customer patience profiles, wherein said evaluating comprises plotting a number of abandoned contacts after an amount of time to obtain a set of model parameters;
  b. identifying an effective customer patience profile;
  c. analyzing the set of model parameters and validating the analysis against the historical Automatic Call Distribution data after the effective customer patience profile has been identified, to determine if a desired model is found;
  d. re-starting the process from step (a) if the desired model is not found until the desired model, which validates against the historical Automatic Call Distribution data, is found; and
  e. saving the model parameters and the customer patience profiles.

38. The method of claim 37, wherein the customer patience profiles of step (a) are derived from the historical Automatic Call Distribution data comprising the steps of:
  a. reading one or more of: model parameters, patience curves, and inputs;
  b. evaluating segmentations; and
  c. analyzing a relationship between abandoned interactions and wait time to derive the customer patience profiles.

39. The method of claim 38, wherein the inputs comprise interval level data of one or more of: contact volume, average handle time, and effective staff.

40. The method of claim 37, wherein the analysis of step (c) further comprises the steps of:
  a. determining an abandon rate, wherein extrapolation is performed if the determination produces an undefined value;
  b. determining a number of abandons;
  c. determining a service level, wherein extrapolation is performed if the determination produces an undefined value; and
  d. determining the average speed of answer value comprising: performing a reverse lookup and analyzing the patience curve relationship to obtain the average speed of answer value from the abandon rate value.

41. The method of claim 40, wherein said abandon rate is determined using the mathematical equation Abandon rate (%)=$(1+(\lambda-s\mu)J)/(\varepsilon+\lambda J)*100$, wherein $\lambda$ represents the call arrival rate, s represents the number of agents or servers, $\mu$ represents the mean processing rate, J represents the function of time variable, and ε represents the inverse of probability of blocking.

42. The method of claim 40, wherein extrapolation further comprises executing a search to find points where the determination has a number value.

43. The method of claim 40, wherein the number of abandons is determined by multiplying the abandon rate by the contact volume.

44. The method of claim 40, wherein the service level is determined using the mathematical equation $$SL(\%) = \frac{\varepsilon + e^u - 1 + s\mu(J - J(\tau))}{\varepsilon + \lambda J}$$

wherein ε represents the inverse of probability of blocking, μ represents the mean processing rate, s represents the number of agents or servers, J represents the function of time variable, and τ represents an Acceptable Wait Time.

45. The method of claim 40, wherein the average speed of answer value is less than the triangular distribution lower limit and the process ends.

46. The method of claim 40, wherein the average speed of answer value is greater than or equal to the triangular distribution lower limit.

47. The method of claim 26, wherein step (d) further comprises the steps of:
  a. applying inputs as one or more of the following: daily staffing, weekly staffing, monthly staffing, average handle time, and volume;
  b. converting, by interval distributions, any higher granularity intervals into simulation model intervals;
  c. applying interval inputs to the validated model for all contact types;
  d. simulating contact center behavior for each contact type;
  e. evaluating any marginal increase in key performance index for the contact center when input changes;
  f. combining all contact types to model the entire contact center network to calculate key performance index values relevant to a holistic system; and
  g. creating a holistic model that combines all contact types.

48. The method of claim 47, wherein the holistic model of step (g) is created with metrics comprising one or more of: average speed of answer, abandonment rate, service level, contacts cross flow volumes, capture rates, prioritizations, and agent utilization.

49. The method of claim 47, wherein the creation is performed using the model with the parameters and segmentation obtained during validation.

50. The method of claim 30, wherein the contact type comprises one or more of: inbound telephone call, e-mail, live chat, and outbound call.

51. The method of claim 30, wherein the type of staff comprises a grouping of one or more agents having a desired skill set.

52. The method of claim 47, wherein the interval distributions comprise a unit of time.

53. The method of claim 52 wherein said unit of time comprises one of: hourly, daily, weekly, and monthly.

54. A method for calculating a predicted service performance of a contact center comprising the steps of:
  a. performing analysis and staging of historical Automatic Call Distribution data for the contact center;
  b. building a model from the analysis and staging of the historical Automatic Call Distribution data, the model comprising a patience curve profile, the patience curve profile being computed based on a customer patience profile comprising a plurality of buckets and a plurality of abandon rates, each of the abandon rates corresponding to one of the buckets;
  c. validating the model against the historical Automatic Call Distribution data, the validating comprising determining a service level, wherein extrapolation is performed if the determination produces an undefined value, wherein the service level is determined using the mathematical equation $$SL(\%) = \frac{\varepsilon + e^u - 1 + s\mu(J - J(\tau))}{\varepsilon + \lambda J},$$

wherein ε represents an inverse of probability of blocking, μ represents a mean processing rate, s represents a number of agents or servers, J represents a function of time variable, and τ represents an Acceptable Wait Time; and
  d. using the validated model to predict the behavior of the contact center, wherein the behavior of the contact center includes at least one of the following: routing, goals, agent prioritization and expected agent utilization.

* * * * *

UNITED STATES PATENT AND TRADEMARK OFFICE
CERTIFICATE OF CORRECTION

| | |
|---|---|
| PATENT NO. | : 10,298,756 B2 |
| APPLICATION NO. | : 14/224409 |
| DATED | : May 21, 2019 |
| INVENTOR(S) | : Andy Raphael Gouw et al. |

It is certified that error appears in the above-identified patent and that said Letters Patent is hereby corrected as shown below:

In the Claims

Column 10, Line 20 (approx.), Claim 15  delete "p" and insert -- µ --

Column 11, Line 45, Claim 26  delete "p" and insert -- µ --

Column 14, Lines 35-36, Claim 54  delete "SL(%)" and insert -- SL (%) --

Signed and Sealed this
Nineteenth Day of May, 2020

Andrei Iancu
*Director of the United States Patent and Trademark Office*